United States Patent
Chen et al.

(10) Patent No.: US 11,990,987 B2
(45) Date of Patent: May 21, 2024

(54) MULTI-WAVELENGTH LIGHT SOURCE AND PHOTONIC CHIP

(71) Applicant: Huawei Technologies Co., Ltd., Shenzhen (CN)

(72) Inventors: Hongmin Chen, Wuhan (CN); Shuangyuan Wu, Shenzhen (CN); Lin Wu, Wuhan (CN); Lantian Liao, Wuhan (CN); Xiaogeng Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 17/587,553

(22) Filed: Jan. 28, 2022

(65) Prior Publication Data

US 2022/0149972 A1 May 12, 2022

Related U.S. Application Data

(63) Continuation of application No. PCT/CN2019/098745, filed on Jul. 31, 2019.

(51) Int. Cl.
*H04J 14/02* (2006.01)
*H04B 10/50* (2013.01)

(52) U.S. Cl.
CPC ........ *H04J 14/0221* (2013.01); *H04B 10/505* (2013.01)

(58) Field of Classification Search
CPC ............................ H04J 14/0221; H04B 10/505
(Continued)

(56) References Cited

U.S. PATENT DOCUMENTS 8,103,168 B1 * 1/2012 Enoch ...................... H04B 1/30
398/140
8,170,417 B2 * 5/2012 Liu ..................... H04J 14/0213
398/83
(Continued)

FOREIGN PATENT DOCUMENTS

CN 1863026 A 11/2006
CN 101686096 A 3/2010
(Continued)

OTHER PUBLICATIONS

Healy et al; Multi-wavelength source using low drive-voltage amplitude modulators for optical communications;2007; Optical Society of America; pp. 1-6. (Year: 2007).*
(Continued)

*Primary Examiner* — Amritbir K Sandhu
(74) *Attorney, Agent, or Firm* — Conley Rose, P.C.

(57) ABSTRACT

A multi-wavelength light source includes a laser, an optical modulator, an optical mixer, an optical demultiplexer, and an optical power adjuster that are sequentially coupled. The laser is configured to generate a first optical signal. The optical modulator modulates the first optical signal, to generate a second optical signal, where the second optical signal includes at least two wavelength components. The optical mixer mixes frequencies based on the at least two wavelength components to generate a third optical signal, where the third optical signal includes at least four wavelength components. The demultiplexer separates the at least four wavelength components. The optical power adjuster adjusts, based on a specified power threshold, a power of each of the wavelength components obtained by separation by the demultiplexer.

20 Claims, 8 Drawing Sheets

(58) Field of Classification Search
USPC .......................................................... 398/79
See application file for complete search history.

(56) References Cited

U.S. PATENT DOCUMENTS

| | | | |
|---|---|---|---|
| 8,582,983 B2 | 11/2013 | Yu | |
| 9,450,696 B2 * | 9/2016 | Shaver | H04J 14/0227 |
| 9,778,493 B1 * | 10/2017 | Krishnamoorthy | H01S 5/142 |
| 10,009,138 B2 * | 6/2018 | Cavaliere | H04B 10/2575 |
| 10,404,399 B2 * | 9/2019 | Wey | H04B 10/2507 |
| 10,498,457 B2 * | 12/2019 | Sakai | H04B 10/5165 |
| 2005/0201443 A1 | 9/2005 | Hayashi et al. | |
| 2012/0020665 A1 | 1/2012 | Watanabe | |
| 2012/0230694 A1 | 9/2012 | Tanaka et al. | |
| 2013/0315269 A1 * | 11/2013 | Liu | H04B 10/506 372/20 |
| 2014/0153931 A1 * | 6/2014 | Doerr | H04B 10/40 398/135 |
| 2021/0306087 A1 * | 9/2021 | Akiyama | H04B 10/07955 |
| 2022/0109518 A1 * | 4/2022 | Ito | H04B 10/2513 |
| 2023/0138252 A1 * | 5/2023 | Mi | H04B 10/572 398/79 |

FOREIGN PATENT DOCUMENTS

| | | | | |
|---|---|---|---|---|
| CN | 101771471 A | | 7/2010 | |
| CN | 104601239 A | | 5/2015 | |
| CN | 109708743 A | * | 5/2019 | |
| EP | 1267510 A2 | * | 12/2002 | .......... H04B 10/506 |
| EP | 3300270 A1 | | 3/2018 | |
| JP | 2009115945 A | | 5/2009 | |
| JP | 2016046412 A | | 4/2016 | |

OTHER PUBLICATIONS

Wang et al; A Time-Division-Multiplexing Scheme for Simultaneous Wavelength Locking of Multiple Silicon Micro-Rings; May 2018; IEEE; pp. 1-4. (Year: 2018).*

Tadhg Healy et al., "Multi-wavelength source using low drive-voltage amplitude modulators for optical communications," Received Dec. 14, 2006; accepted Feb. 13, 2007, 6 pages.

O'Reilly, J. J et al., "Optical generation of very narrow linewidth millimetre wave signals," Electronics Letters, 1992, vol. 28, No. 25, 1 page.

* cited by examiner

MULTI-WAVELENGTH LIGHT SOURCE AND PHOTONIC CHIP

CROSS-REFERENCE TO RELATED APPLICATIONS

This disclosure is a continuation of International Patent Application No. PCT/CN2019/098745, filed on Jul. 31, 2019, the disclosure of which is hereby incorporated by reference in its entirety.

TECHNICAL FIELD

This disclosure relates to the field of optical communications technologies, and in particular, to a multi-wavelength light source and a photonic chip.

BACKGROUND

Currently, in most wavelength division multiplexing (WDM) communications systems, a transmit end separately modulates and encodes each wavelength, a guard gap exists between adjacent wavelengths, and a receive end separately processes a signal of each wavelength. As a result, spectrum efficiency (SE) is significantly decreased, and a transmission distance is greatly shortened.

To improve performance (e.g., SE and a transmission distance) of a wavelength division multiplexing communications system, a super channel technology emerges, for example, joint modulation and encoding are performed for a plurality of wavelengths, there is no guard gap between wavelengths, and some overlapping between the wavelengths is even allowed. Processing (e.g., nonlinear compensation and dispersion compensation) is performed on signals of the plurality of wavelengths by using an optical digital signal processor (ODSP). Joint processing on the signals of the plurality of wavelengths can significantly increase the spectrum efficiency and the transmission distance of the wavelength division multiplexing system.

In the super channel technology, frequency offset characteristics (relative stability of a center frequency of a plurality of wavelengths) and phase correlation between the wavelengths are essential for improving the performance of the wavelength division multiplexing communications system. Therefore, the super channel technology needs a multi-wavelength light source with stable frequency offset characteristics, correlated phase characteristics, and a large output power. However, no multi-wavelength light source in the industry can meet the foregoing characteristics.

SUMMARY

This disclosure provides a multi-wavelength light source and a photonic chip to improve performance of a wavelength division multiplexing communications system.

According to a first aspect, this disclosure provides a multi-wavelength light source, where the multi-wavelength light source includes: a laser, configured to generate a first optical signal; an optical modulator, configured to modulate the first optical signal generated by the laser, to generate a second optical signal, where the second optical signal includes at least two wavelength components; an optical mixer, configured to mix frequencies based on the at least two wavelength components in the second optical signal to generate a third optical signal, where the third optical signal includes at least four wavelength components; a demultiplexer, configured to separate the at least four wavelength components in the third optical signal from the third optical signal; and an optical power adjuster, configured to adjust, based on a specified power threshold, a power of each of the at least four wavelength components obtained by separation by the demultiplexer.

According to the foregoing solution, the multi-wavelength light source can generate a multi-wavelength optical signal with a relatively stable phase relationship, a relatively stable relative frequency offset, and a relatively high power by using an architecture of the laser, the optical modulator, and the optical mixer. In addition, a modulation amplitude of the optical modulator is small, and a generated optical signal power loss is relatively small. Therefore, the multi-wavelength light source has a relatively small loss, thereby improving the performance of the wavelength division multiplexing communications system.

In a possible implementation, the laser includes but is not limited to any one of an external cavity laser (ECL), a distributed Bragg reflector (DBR) laser, a distributed feedback laser (DFB), or a quantum well (QW) semiconductor laser.

In a possible implementation, the optical modulator may be a Mach-Zehnder modulator (MZM).

In a possible implementation, the optical mixer may be a four-wave mixing (FWM) semiconductor optical amplifier (SOA). The FWM SOA not only can generate more wavelength components by frequency mixing, but also can amplify a generated third optical signal including these wavelength components. This helps increase a power of an optical signal finally output by the multi-wavelength light source. In addition, a power difference between the wavelength components in the third optical signal is relatively small, which helps the optical power adjuster perform power equalization.

In a possible implementation, the optical power adjuster is configured to: when the power of each of the wavelength components obtained by separation by the demultiplexer is greater than the specified power threshold, decrease the power of each of the wavelength components obtained by separation by the demultiplexer; or when the power of each of the wavelength components obtained by separation by the demultiplexer is less than the power threshold, increase the power of each of the wavelength components obtained by separation by the demultiplexer.

In a possible implementation, the optical power adjuster includes at least four SOAs, and the at least four SOAs correspond one to one to the at least four wavelength components obtained by separation by the demultiplexer. The at least four SOAs are configured to adjust the powers of the corresponding wavelength components, respectively. The SOAs can amplify the powers of the wavelength components, so as to reduce a loss of the wavelength components in a power adjustment process, and increase the adjusted powers of the wavelength components.

In a possible implementation, the multi-wavelength light source may further include a wavelength locker. The wavelength locker is configured to stabilize a wavelength of the first optical signal generated by the laser. The wavelength locker may perform optical splitting from any one of the laser, the modulator, the optical mixer, the demultiplexer, and the optical power adjuster. The wavelength locker is configured to control the laser to adjust the wavelength of the first optical signal based on the wavelength of the obtained first optical signal and the wavelength, set to meet the actual requirement, of the optical signal obtained at the splitting location of the first optical signal.

The wavelength locker may be separately coupled to the laser and the demultiplexer, and is configured to detect a wavelength of any one of the at least four wavelength components obtained by separation by the demultiplexer, and when the detected wavelength of the wavelength component exceeds a specified wavelength range, control the laser to adjust the wavelength of the first optical signal.

In a possible implementation, the multi-wavelength light source further includes a drive circuit, where the drive circuit is coupled to the optical modulator, and is configured to output a drive signal to the modulator; and the optical modulator is configured to modulate the first optical signal by using the drive signal output by the drive circuit, to obtain the second optical signal, where second optical signal includes a first wavelength component and a second wavelength component; and a frequency of the first wavelength component is f0+fm, a frequency of the second wavelength component is f0−fm, where f0 is a frequency of the first optical signal, and fm is a frequency of the drive signal.

In a possible implementation, the drive circuit is coupled the optical modulator over an inductive wire (that is, an impedance of the wire is inductive), and when the frequency of the drive signal is fm, the optical modulator has maximum conversion efficiency. The inductive wire may be implemented by using a gold wire (wire bond) process.

Because an impedance of the optical modulator is capacitive, an inductor-capacitor (LC) resonant circuit may be formed by using the impedance of the inductive wire and the impedance of the optical modulator. In this way, the LC resonant circuit resonates at the frequency fm, so that the optical modulator has the maximum conversion efficiency. Further, when an amplitude of an input signal is fixed, a higher output power can be obtained, and a power of the drive signal can be reduced.

In a possible implementation, an optical waveguide material of the demultiplexer is silicon nitride (SiNx), silicon (Si), or silicon dioxide ($SiO_2$), so that a tuning range is expanded by using a Vernier effect. In this way, a band corresponding to an optical signal separable by the demultiplexer is adjustable within a specific range.

In a possible implementation, the optical power adjuster is coupled to the demultiplexer in a flip-chip manner. The flip-chip coupling manner can increase coupling efficiency, and reduce a size of the multi-wavelength light source.

In a possible implementation, the wavelength locker and the demultiplexer are integrated in a first chip. Because the wavelength locker may use a same optical waveguide material as the demultiplexer, monolithic integration is relatively easy to implement, thereby reducing processing complexity.

In a possible implementation, the laser, the optical modulator, and the optical mixer are integrated in a second chip, so that the multi-wavelength light source has a compact structure. The second chip may be monolithically integrated by mixing heterogeneous materials, or may be monolithically integrated by using a homogeneous material (such as, e.g., an indium phosphide (InP)).

In a possible implementation, the laser, the optical modulator, the optical mixer, and the optical power adjuster are integrated in the second chip, so that the multi-wavelength light source has a compact structure. In a scenario in which the wavelength locker and the demultiplexer are integrated in the first chip, the multi-wavelength light source includes the first chip and the second chip, and the entire multi-wavelength light source has a compact structure, a relatively small volume, and relatively low costs.

In a possible implementation, the second chip is coupled to the demultiplexer in a spatial coupling manner or an evanescent wave coupling manner. In an example, in a scenario in which the laser, the optical modulator, and the optical mixer are integrated in the second chip, the optical mixer in the second chip is coupled to the demultiplexer in the spatial coupling manner or the evanescent wave coupling manner. In a scenario in which the laser, the optical modulator, the optical mixer, and the optical power adjuster are integrated in the second chip, the optical mixer and the optical power adjuster in the second chip are coupled to the demultiplexer in the spatial coupling manner or the evanescent wave coupling manner.

In a possible implementation, in a scenario in which the laser, the optical modulator, and the optical mixer are integrated in the second chip, when the second chip is coupled to the demultiplexer in the spatial coupling manner, the optical mixer in the second chip is coupled to the demultiplexer by using a lens. In a scenario in which the laser, the optical modulator, the optical mixer, and the optical power adjuster are integrated in the second chip, the optical mixer and the optical power adjuster in the second chip may be coupled to the demultiplexer by using a lens.

In a possible implementation, the laser, the optical modulator, the optical mixer, the demultiplexer, the optical power adjuster, and the wavelength locker are integrated in a third chip, that is, components in the multi-wavelength light source are integrated together.

According to a second aspect, this disclosure further provides a photonic chip, where the photonic chip includes the multi-wavelength light source according to any one of the possible implementations of the first aspect.

It can be understood that, any photonic chip provided above includes the multi-wavelength light source according to the first aspect. Therefore, for beneficial effects that can be achieved by the photonic chip, refer to beneficial effects of the corresponding multi-wavelength light source provided in the first aspect. Details are not described herein again.

DESCRIPTION OF EMBODIMENTS

Figure 1:
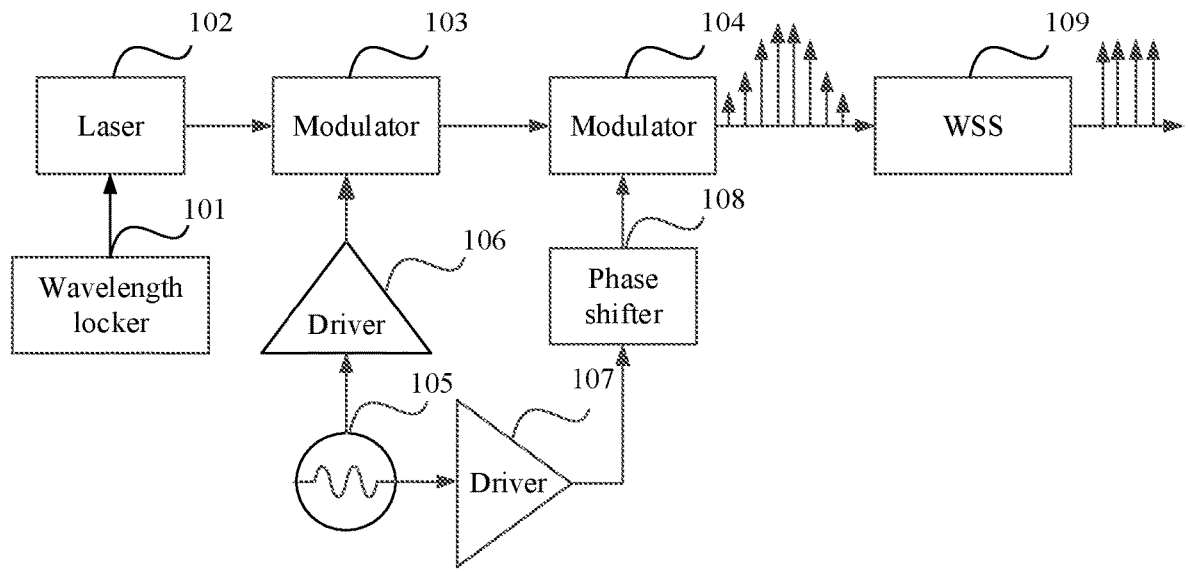
FIG. 1 is a schematic diagram of a structure of a multi-wavelength light source in the conventional technologies.

In a super channel technology, frequency offset characteristics (e.g., relative stability of a center frequency of a plurality of wavelengths) and phase correlation between the wavelengths are essential for improving performance of a wavelength division multiplexing communications system. In the conventional technologies, a multi-wavelength light source (using a four-wavelength light source as an example) is mainly implemented in the following two manners:

Manner 1: The plurality of wavelengths are implemented by cascading MZMs. As shown in FIG. 1, the multi-wavelength light source is formed by discrete components such as a wavelength locker 101, a laser 102, two cascaded MZMs 103 and 104, a clock system 105, drivers 106 and 107, a phase shifter 108, and a wavelength select switch (WSS) 109. The wavelength locker 101 is configured to stabilize a wavelength of an optical signal generated by the laser 102. The laser 102 is usually a commercial laser, and is configured to generate the optical signal. The clock system 105 usually generates a clock signal by using a high-precision clock instrument, and is configured to control a wavelength interval for emitting the optical signal by the laser 102. The driver 106 and the driver 107 are configured to amplify the clock signal generated by the clock system 105. The phase shifter 108 is configured to adjust a phase of the clock signal amplified by the driver 107, so that the MZM 104 can generate an optical carrier signal with more wavelengths and an output power of the MZM 104 is flat. The MZM 103 is configured to modulate, based on the clock signal amplified by the driver 106, the optical signal generated by the laser 102. The MZM 104 is configured to modulate, based on the signal output by the phase shifter 108, an optical signal output by the MZM 103. The WSS 109 is configured to decompose an optical signal output by the MZM 104 into a plurality of optical carrier signals, and attenuate powers of the plurality of optical carrier signals to a same value.

However, each level of MZM generates both a direct current loss and a modulation loss. In addition, the WSS adjusts and stabilizes an optical power by attenuation, and usually has a loss of about 7 decibels (dB) to 20 dB. This further leads to relatively low conversion efficiency of the multi-wavelength light source. As a result, the plurality of finally output optical carrier signals have very low powers, and a power budget cannot be met. Moreover, when the optical carrier signals generated by the multi-wavelength light source are used for data transmission, a receiving sensitivity requirement of a receive end cannot be met.

Figure 2:
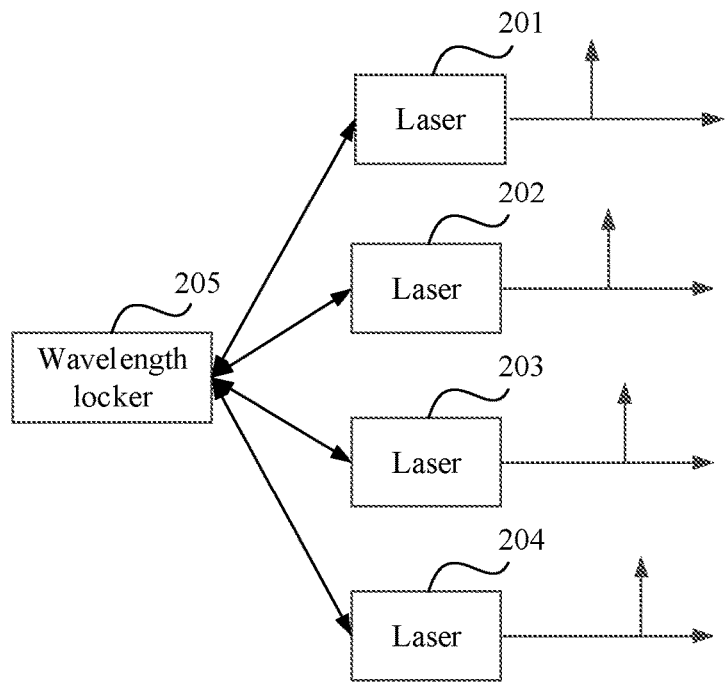
FIG. 2 is a schematic diagram of a structure of another multi-wavelength light source in the conventional technologies.

Manner 2: Four independent light sources share one wavelength locker to implement the multi-wavelength light source. The wavelength locker is configured to control a relative frequency offset of an optical carrier generated by each light source. As shown in FIG. 2, the multi-wavelength light source includes four independent lasers 201 to 204, which share one wavelength locker 205.

However, phase noise of the four lasers 201 to 204 is independently distributed and has no correlation. This further deteriorates the performance of the wavelength division multiplexing communications system. In addition, the relative frequency offset of the optical carrier generated by each light source has relatively low control precision.

To resolve the foregoing problems in the conventional technologies, this disclosure provides a multi-wavelength light source and a photonic chip to improve performance of a wavelength division multiplexing communications system.

In addition, it should be understood that, in the description of this disclosure, "a plurality of" refers to two or more. Terms such as "first" and "second" are used only for distinguishing between descriptions, but cannot be understood as an indication or implication of relative importance, and cannot be understood as an indication or implication of a sequence.

To make objectives, technical solutions, and advantages of this disclosure more clearly, the following further describes this disclosure in detail with reference to the accompanying drawings.

Figure 3:
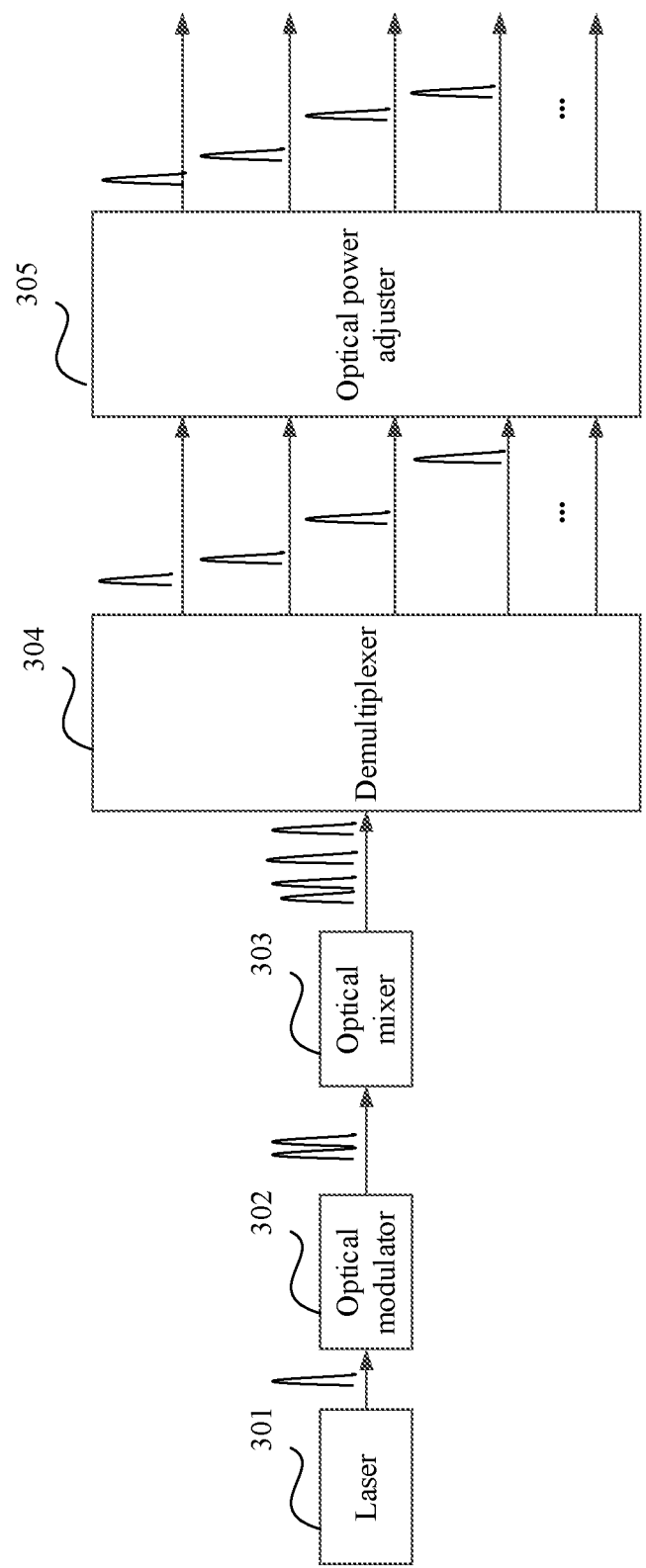
FIG. 3 is a schematic diagram 1 of a structure of a multi-wavelength light source according to an embodiment of this disclosure.

This disclosure provides a multi-wavelength light source, applied to a high wavelength division multiplexing communications system. As shown in FIG. 3, the multi-wavelength light source includes a laser 301, an optical modulator 302, an optical mixer 303, an optical demultiplexer 304, and an optical power adjuster 305 that are sequentially coupled.

The laser 301 is configured to generate a first optical signal. The laser 301 includes but is not limited to any one of an ECL, a DBR laser, a DFB, or a QW semiconductor laser.

The optical modulator 302 is configured to modulate the first optical signal generated by the laser 301, to generate a second optical signal, where the second optical signal includes at least two wavelength components. The optical modulator 302 may be an MZM.

The optical mixer 303 is configured to mix frequencies based on the at least two wavelength components in the second optical signal to generate a third optical signal, where the third optical signal includes at least four wavelength components. The optical mixer 303 may be a FWM SOA. The FWM SOA not only can generate the third optical signal, but also can amplify the third optical signal. This helps increase a power of an optical signal finally output by the multi-wavelength light source. In addition, a power difference between the wavelength components in the third optical signal is relatively small, which helps the optical power adjuster 305 perform power equalization.

The demultiplexer (DEMUX) 304 is configured to separate the at least four wavelength components in the third optical signal from the third optical signal.

The optical power adjuster 305 is configured to adjust, based on a specified power threshold, a power of each of the at least four wavelength components obtained by separation by the demultiplexer 304.

Further, the optical power adjuster 305 is configured to, when the power of each of the wavelength components obtained by separation by the demultiplexer 304 is greater than the specified threshold, decrease the power of each of the wavelength components obtained by separation by the demultiplexer 304; or when the power of each of the wavelength components obtained by separation by the demultiplexer 304 is less than the specified threshold, increase the power of each of the wavelength components obtained by separation by the demultiplexer 304. In this way, a difference between an adjusted power of the wavelength component and the specified power threshold falls within a specified error range, that is, the adjusted powers of the at least four wavelength components are equal or approximately equal.

Further, the multi-wavelength light source may further include a wavelength locker 306. The wavelength locker is configured to stabilize a wavelength of the first optical signal generated by the laser 301. The wavelength locker may perform optical splitting from any one of the laser 301, the modulator 302, the optical mixer 303, the demultiplexer 304, and the optical power adjuster 305, obtain a wavelength of an optical signal at an optical splitting point based on the wavelength of the obtained optical signal and the first optical signal specified based on an actual requirement, and control the laser 301 to stabilize the wavelength of the first optical signal within a specified range.

Figure 4:
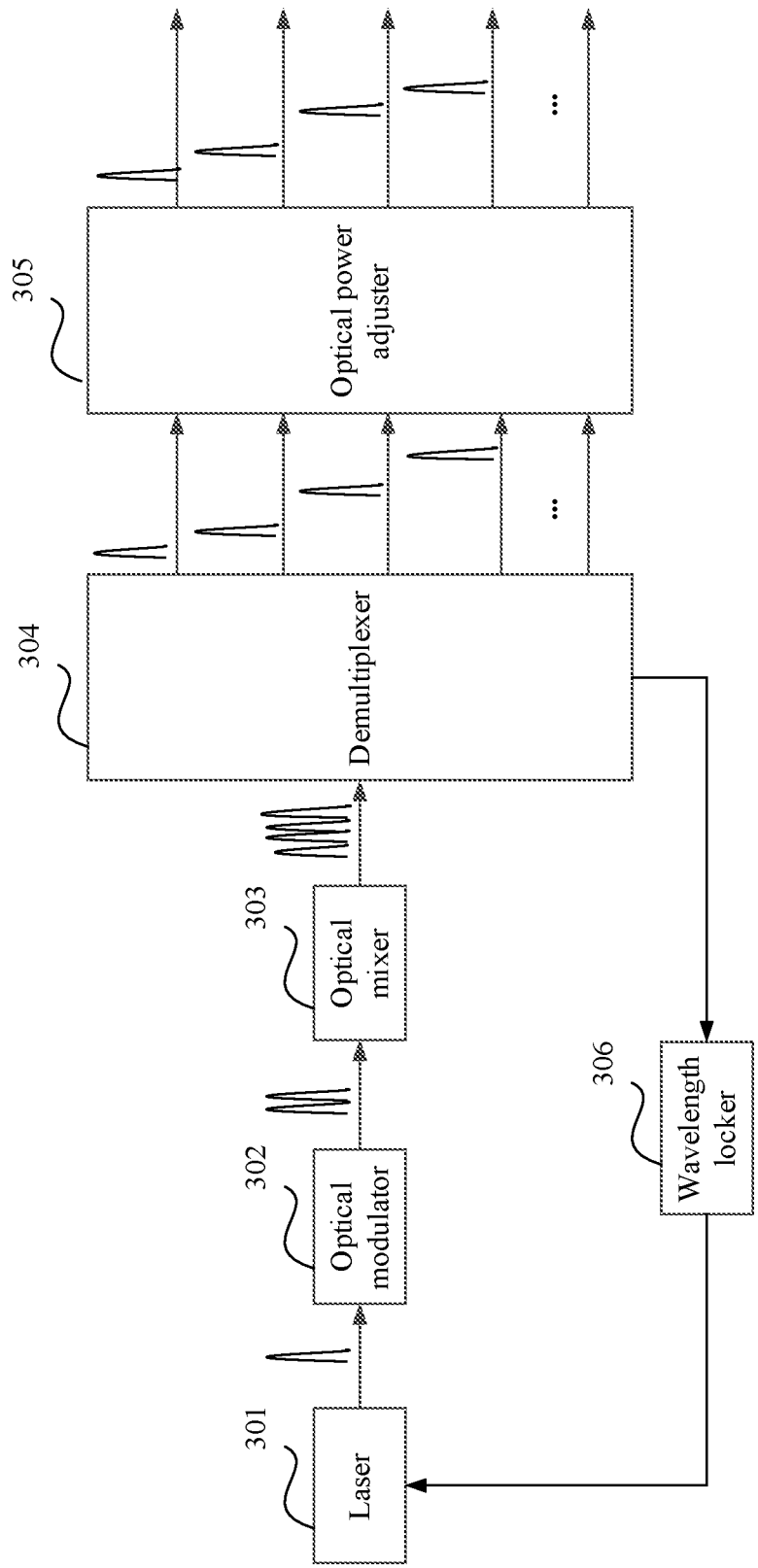
FIG. 4 is a schematic diagram 2 of a structure of a multi-wavelength light source according to an embodiment of this disclosure.

In specific implementation, the wavelength locker may use a same optical waveguide material as the demultiplexer, and it is relatively easy to monolithically integrate the wavelength locker and the demultiplexer. Therefore, the wavelength locker usually performs optical splitting from the demultiplexer, so as to adjust the wavelength of the first optical signal generated by the laser. In this scenario, as shown in FIG. 4, the wavelength locker 306 is separately coupled to the laser 301 and the demultiplexer 304, and is configured to detect a wavelength of any one of the at least four wavelength components obtained by separation by the demultiplexer 304, and when the detected wavelength of the wavelength component exceeds a specified wavelength range, control the laser 301 to adjust the wavelength of the first optical signal.

The wavelength locker 306 integrates both a photodetector (PD) and a variable optical attenuator (VOA) to implement precise closed-loop locking of a wavelength of an optical signal.

Figure 5:
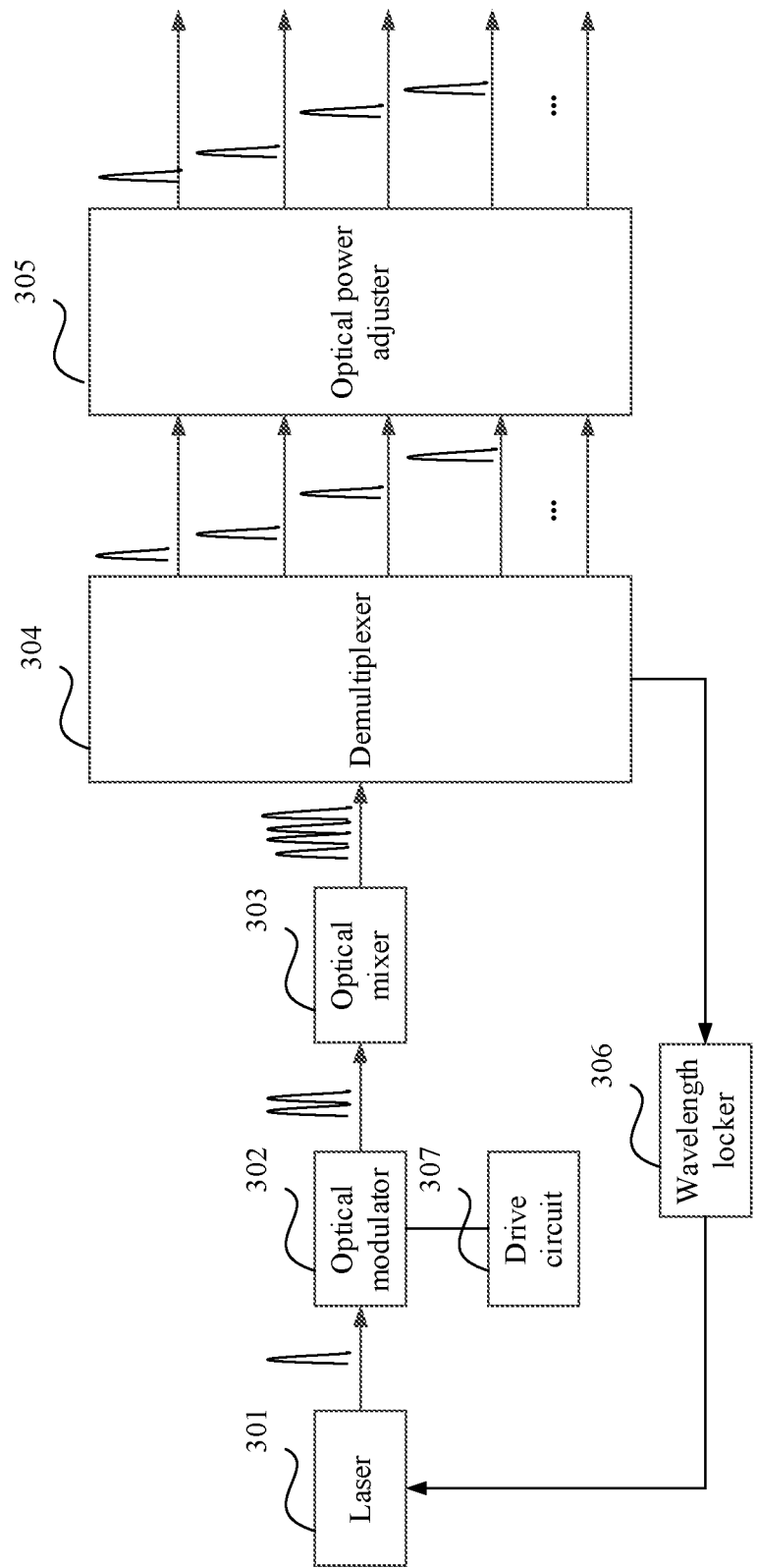
FIG. 5 is a schematic diagram 3 of a structure of a multi-wavelength light source according to an embodiment of this disclosure.

Further, as shown in FIG. 5, the multi-wavelength light source further includes a drive circuit 307, where the drive circuit 307 is coupled to the optical modulator 302, and is configured to output a drive signal to the modulator 302; and the optical modulator 302 is configured to modulate the first optical signal by using the drive signal output by the drive circuit 307, to obtain the second optical signal, where second optical signal includes a first wavelength component and a second wavelength component; and a frequency of the first wavelength component is f0+fm, a frequency of the second wavelength component is f0−fm, f0 is a frequency of the first optical signal, and fm is a frequency of the drive signal.

Figure 6:
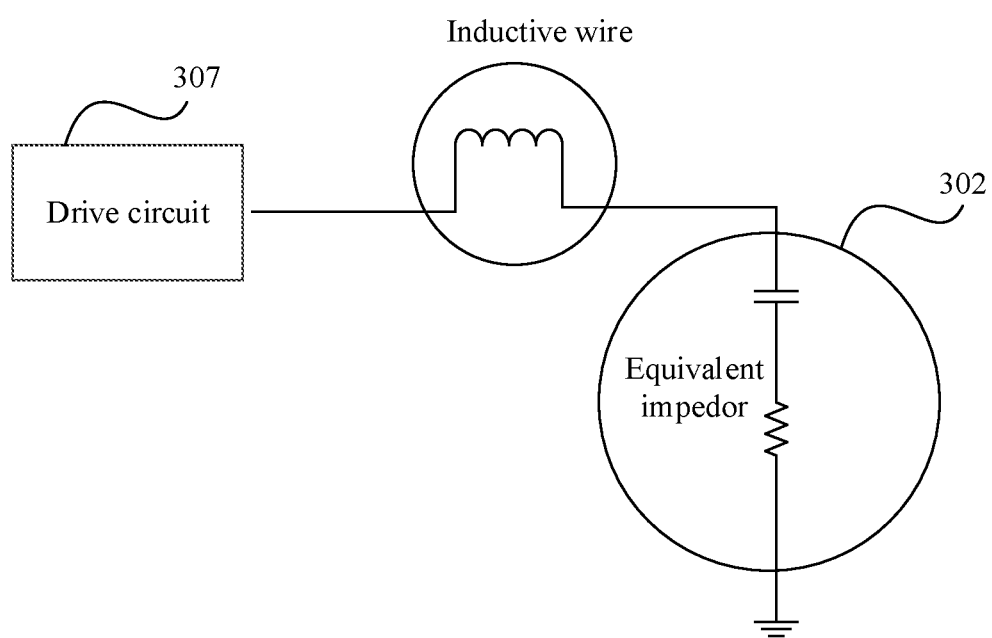
FIG. 6 is a schematic diagram of a connection between a drive circuit and an optical modulator in a multi-wavelength light source according to an embodiment of this disclosure.

Further, as shown in FIG. 6, the drive circuit 307 is coupled the optical modulator over an inductive wire (that is, an impedance of the wire is inductive), and when the frequency of the drive signal is fm, the optical modulator 302 has maximum conversion efficiency. The inductive wire may be implemented by using a gold wire (wire bond) process. Because an impedance of the optical modulator 302 is capacitive, an LC resonant circuit may be formed by using the impedance of the inductive wire and the impedance of the optical modulator 302. In this way, the LC resonant circuit resonates at the fm, so that the optical modulator 302 has the maximum conversion efficiency. Further, when an amplitude of an input signal is fixed, a higher output power can be obtained, and a power of the drive signal can be reduced.

The following describes a working principle of each component in the multi-wavelength light source by using an example in which the multi-wavelength light source is a four-wavelength light source. The laser 301 generates a first optical signal, where a wavelength (λ) of the first optical signal is λ0, and a frequency of the first optical signal is f0. The modulator 302 modulates the first optical signal by using a drive signal provided by the drive circuit 307, to obtain a second optical signal, where the second optical signal includes a first wavelength component whose wavelength is λ21 and a second wavelength component whose wavelength is λ22, a frequency of the first wavelength component is f0+fm, and a frequency of the second wavelength component is f0−fm. The optical mixer 303 mixes frequencies to obtain a third optical signal, where the third optical signal includes a third wavelength component whose wavelength is λ21, a fourth wavelength component whose wavelength is λ22, a fifth wavelength component whose wavelength is λ31, and a sixth wavelength component whose wavelength is λ32, a frequency of the third wavelength component is f0+fm, a frequency of the fourth wavelength component is f0−fm, a frequency of the fifth wavelength component is f0+3fm, and a frequency of the sixth wavelength component is f0−3fm. The demultiplexer 304 separates the four wavelength components from the third optical signal. The optical power adjuster 305 adjusts a power of each of the four wavelength components obtained by the demultiplexer 304, where the four adjusted wavelength components may be used as optical carriers in the wavelength division multiplexing communications system.

In specific implementation, the demultiplexer 304 may be implemented by using a multi-channel adjustable bandpass filter, so that an interfering wavelength component that is in the third optical signal and that is generated by the optical mixer 303 can be filtered out to obtain useful wavelength components, so as to further separate the at least four wavelength components in the third optical signal from the third optical signal. An optical waveguide material of the demultiplexer 304 is SiNx, Si, or SiO2, so that a tuning range is expanded by using a vernier effect. In this way, a band corresponding to an optical signal separable by the demultiplexer 304 is adjustable within a specific range.

Further, the optical power adjuster 305 is coupled to the demultiplexer 304 in a flip-chip manner. The flip-chip coupling manner can increase coupling efficiency, and reduce a size of the multi-wavelength light source.

Further, the optical power adjuster 305 includes at least four SOAs, and the at least four SOAs one to one correspond to the at least four wavelength components obtained by separation by the demultiplexer 304. The at least four SOAs are configured to adjust the powers of the corresponding wavelength components, respectively. The SOAs can amplify the powers of the wavelength components, so as to reduce a loss of the wavelength components (obtained by separation) in a power adjustment process, and increase the adjusted powers of the wavelength components.

Figure 7:
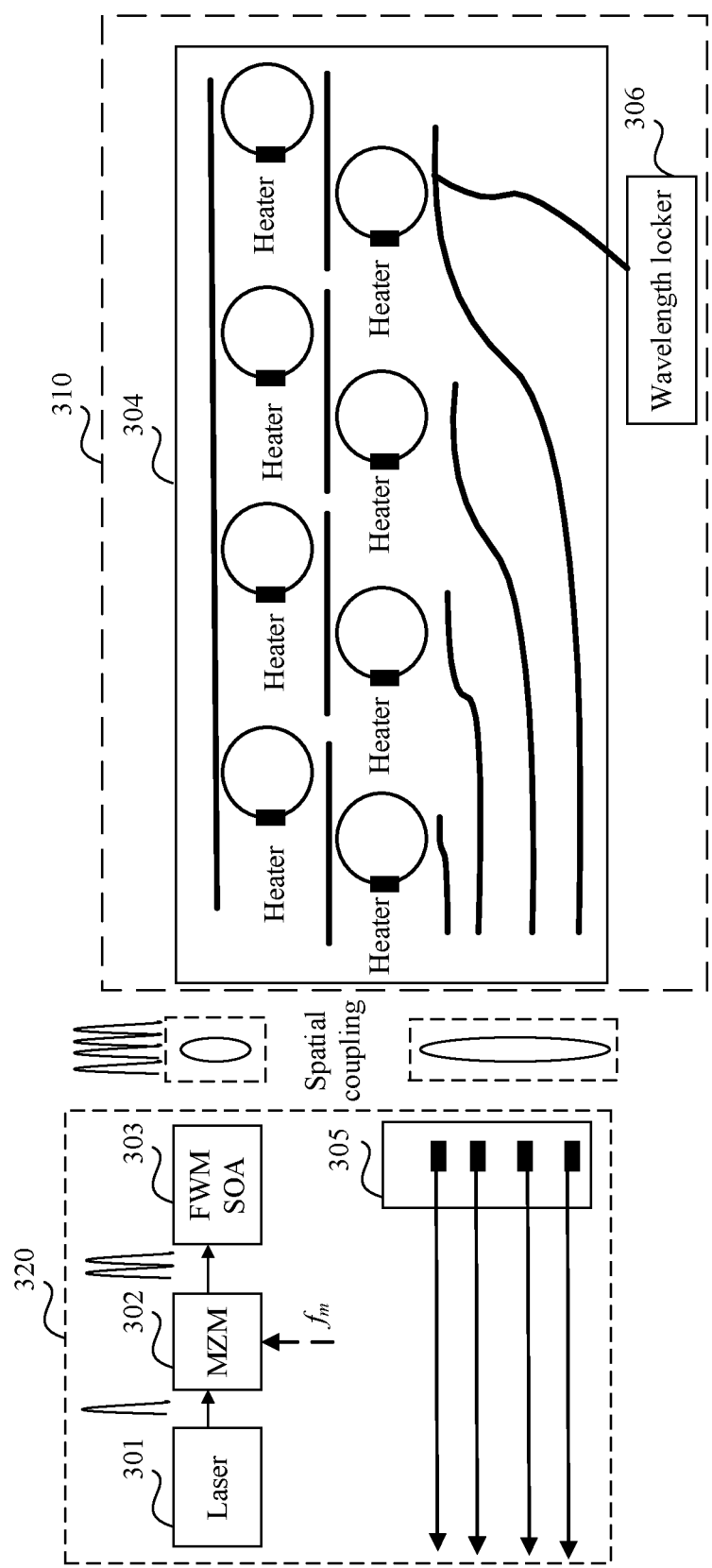
FIG. 7 is a schematic diagram 4 of a structure of a multi-wavelength light source according to an embodiment of this disclosure.

In specific implementation, as shown in FIG. 7, the wavelength locker 306 and the demultiplexer 304 are integrated in a first chip 310. Because the wavelength locker 306 may use a same optical waveguide material as the demultiplexer 304, monolithic integration is relatively easy to implement, thereby reducing processing complexity.

Figure 8:
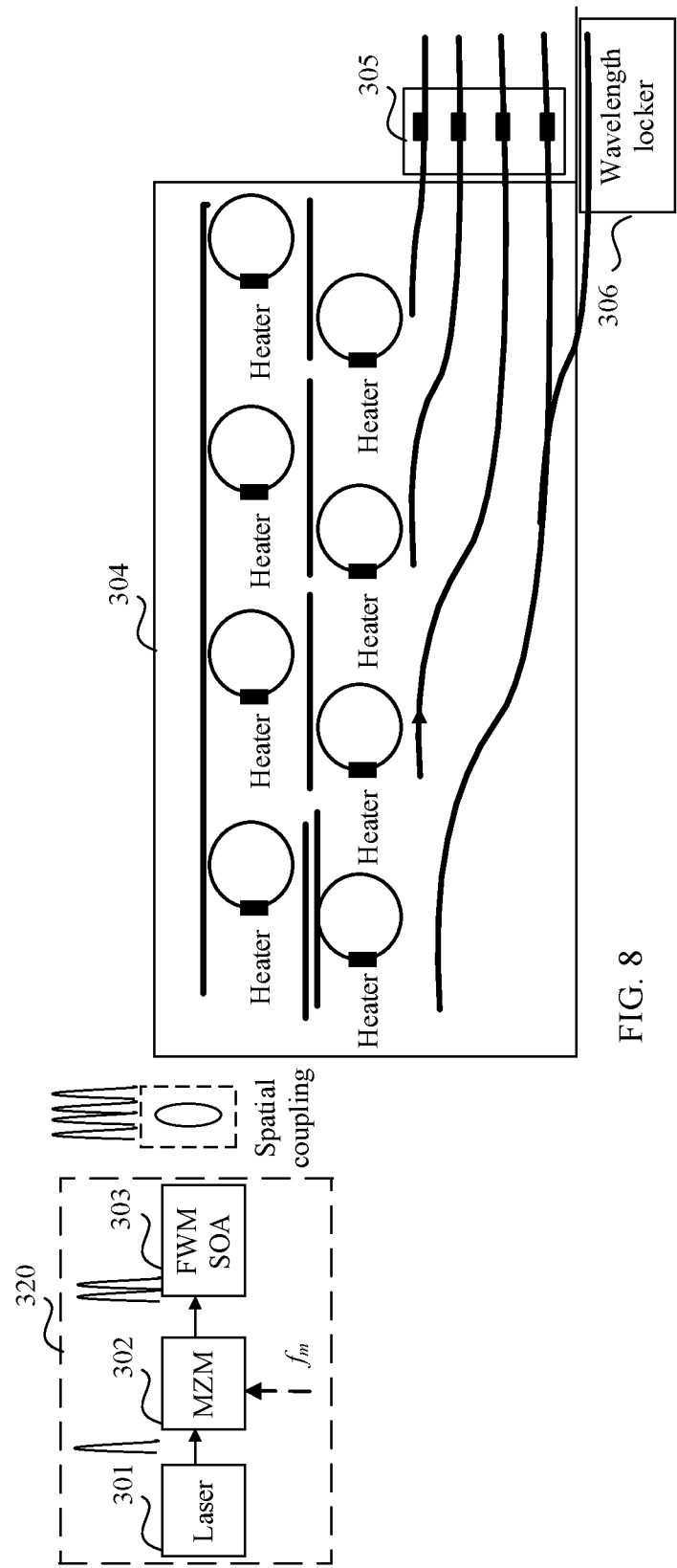
FIG. 8 is a schematic diagram 5 of a structure of a multi-wavelength light source according to an embodiment of this disclosure.

In a possible implementation, as shown in FIG. 8, the laser 301, the optical modulator 302, and the optical mixer 303 are integrated in a second chip 320. The second chip 320 may be monolithically integrated by mixing heterogeneous materials, or may be monolithically integrated by using a homogeneous material (such as InP).

Further, as shown in FIG. 7, the optical power adjuster 305 may also be integrated in the second chip 320, that is, the laser 301, the optical modulator 302, the optical mixer 303, and the optical power adjuster 305 are all integrated in the second chip 320. In a scenario in which the wavelength locker 306 and the demultiplexer 304 are integrated in the first chip 310, the multi-wavelength light source includes the first chip 310 and the second chip 320 (as shown in FIG. 7), and the entire multi-wavelength light source has a compact structure, a relatively small volume, and relatively low costs.

Further, the second chip 320 is coupled to the demultiplexer 304 in a spatial coupling manner or an evanescent wave coupling manner. In an example, in a scenario in which the laser 301, the optical modulator 302, and the optical mixer 303 are integrated in the second chip 320, the optical mixer 303 in the second chip 320 is coupled to the demultiplexer 304 in the spatial coupling manner or the evanescent wave coupling manner. Further, when the second chip 320 is coupled to the demultiplexer 304 in the spatial coupling manner, the optical mixer 303 in the second chip 320 is coupled to the demultiplexer 304 by using a lens, as shown in FIG. 8. When the second chip 320 is coupled to the demultiplexer 304 in the evanescent wave coupling manner, the second chip 320 and the demultiplexer 304 may be stacked and disposed, thereby reducing the volume of the multi-wavelength light source.

In an example, in a scenario in which the laser 301, the optical modulator 302, the optical mixer 303, and the optical power adjuster 305 are integrated in the second chip 320, the optical mixer 303 and the optical power adjuster 305 in the second chip 320 are coupled to the demultiplexer 304 in the spatial coupling manner or the evanescent wave coupling manner. Further, when the second chip 320 is coupled to the demultiplexer 304 in the spatial coupling manner, the optical mixer 303 and the optical power adjuster 305 in the second chip 320 each may be coupled to the demultiplexer 304 by using a lens, as shown in FIG. 7. When the second chip 320 is coupled to the demultiplexer 304 in the evanescent wave coupling manner, the second chip 320 and the demultiplexer 304 may be stacked and disposed, thereby reducing the volume of the multi-wavelength light source. For example, in a scenario in which the wavelength locker 306 and the demultiplexer 304 are integrated in the first chip 310, the first chip 310 and the second chip 320 are stacked and disposed. The demultiplexer 304 in the first chip 310 is coupled to the optical mixer 303 and the optical power adjuster 305 in the second chip 320 in the evanescent wave coupling manner.

Figure 9:
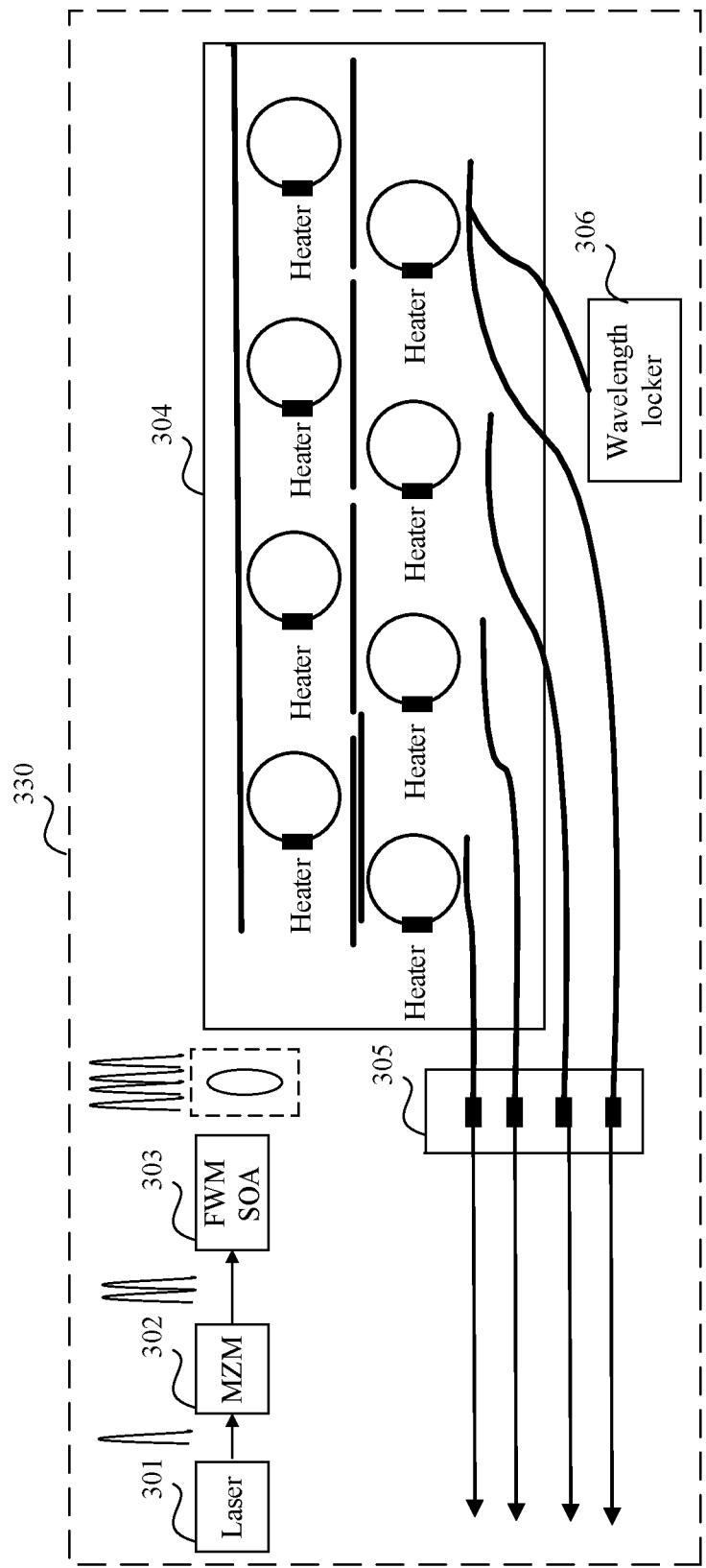
FIG. 9 is a schematic diagram 6 of a structure of a multi-wavelength light source according to an embodiment of this disclosure.

In another possible implementation, as shown in FIG. 9, the laser 301, the optical modulator 302, the optical mixer 303, the demultiplexer 304, the optical power adjuster 305, and the wavelength locker 306 are integrated in a third chip 330, that is, the components in the multi-wavelength light source are integrated together. In an example, the third chip 330 may be monolithically integrated by using InP.

According to the foregoing solution, the multi-wavelength light source can generate a multi-wavelength optical signal with a relatively stable phase relationship, a relatively stable relative frequency offset, and a relatively high power by using an architecture of the laser 301, the optical modulator 302, and the optical mixer 303. In addition, a modulation amplitude of the optical modulator 302 is small, efficiency of the modulator is high, and a generated optical signal power loss is relatively small. Therefore, the multi-wavelength light source has a relatively small loss, thereby improving the performance of the wavelength division multiplexing communications system.

According to the foregoing embodiments, this disclosure further provides a photonic chip. The photonic chip includes the multi-wavelength light source according to any one of the foregoing implementations.

It should be understood that, the photonic chip provided in this disclosure is a complete photonic chip, and also has structures (such as an optical detector and an optical multiplexer) of a known photonic chip. Only a component in the photonic chip that is related to generation of a multi-wavelength optical signal is described herein. Other components are not described in detail.

It is clear that a person skilled in the art can make various modifications and variations to this disclosure without departing from the spirit and scope of this disclosure. This disclosure is intended to cover these modifications and variations of this disclosure provided that they fall within the scope of protection defined by the claims of this disclosure and equivalent technologies thereof.

What is claimed is:

1. A multi-wavelength light source, comprising:
a laser configured to generate a first optical signal;
an optical modulator coupled to the laser and configured to modulate the first optical signal to obtain a second optical signal, wherein the second optical signal comprises at least two wavelength components;
an optical mixer coupled to the optical modulator and configured to mix frequencies of the at least two wavelength components to obtain a third optical signal, wherein the third optical signal comprises at least four wavelength components;
a demultiplexer coupled to the optical mixer and configured to separate the at least four wavelength components into separate wavelength components;
a wavelength locker coupled to the laser and the demultiplexer and configured to:
detect a wavelength of any one of the separate wavelength components; and
control the laser to adjust a first wavelength of the first optical signal when the wavelength of any one of the separate wavelength components exceeds a wavelength range; and
an optical power adjuster coupled to the demultiplexer and configured to adjust, based on a power threshold, powers of the separate wavelength components.

2. The multi-wavelength light source of claim 1, wherein the optical power adjuster is further configured to decrease the powers of each of the separate wavelength components when the powers of each of the separate wavelength components are greater than the power threshold.

3. The multi-wavelength light source of claim 1, further comprising a first photonic chip, wherein the wavelength locker and the demultiplexer are integrated in the first photonic chip.

4. The multi-wavelength light source of claim 1, further comprising a drive circuit coupled to the optical modulator and configured to output a drive signal to the optical modulator, wherein the optical modulator is further configured to modulate the first optical signal using the drive signal to obtain the second optical signal, wherein the second optical signal comprises a first wavelength component and a second wavelength component, wherein a first frequency of the first wavelength component is $f0+fm$, a second frequency of the second wavelength component is $f0-fm$, wherein $f0$ is a frequency of the first optical signal, and wherein $fm$ is a frequency of the drive signal.

5. The multi-wavelength light source of claim 4, further comprising an inductive wire, wherein the drive circuit is coupled to the optical modulator over via the inductive wire, and wherein the optical modulator has a maximum conversion efficiency when the frequency of the drive signal is the $fm$.

6. The multi-wavelength light source of claim 1, further comprising a second photonic chip, and wherein the laser, the optical modulator, and the optical mixer are integrated in the second photonic chip.

7. The multi-wavelength light source of claim 6, wherein the optical power adjuster is integrated in the second photonic chip.

8. The multi-wavelength light source of claim 6, wherein the second photonic chip is coupled to the demultiplexer in a spatial coupling manner or an evanescent wave coupling manner.

9. The multi-wavelength light source of claim 1, further comprising a third photonic chip, and wherein the laser, the optical modulator, the optical mixer, the demultiplexer, the optical power adjuster, and the wavelength locker are integrated in the third photonic chip.

10. The multi-wavelength light source of claim 1, wherein the optical power adjuster is coupled to the demultiplexer in a flip-chip manner.

11. The multi-wavelength light source of claim 1, wherein the demultiplexer has an optical waveguide material that is silicon nitride (SiNx), silicon (Si), or silicon dioxide (SiO2).

12. The multi-wavelength light source of claim 1, wherein the optical mixer is a four-wave mixing semiconductor optical amplifier.

13. The multi-wavelength light source of claim 1, wherein the optical power adjuster comprises at least four semiconductor optical amplifiers (SOA), wherein the at least four SOAs correspond to the at least four wavelength components, and wherein the at least four SOAs are configured to adjust the powers of the respective wavelength component.

14. The multi-wavelength light source of claim 1, wherein the optical modulator is a Mach-Zehnder modulator (MZM).

15. The multi-wavelength light source of claim 1, wherein the optical power adjuster is further configured to increase the powers of each of the separate wavelength components when the powers of each of the separate wavelength components are less than the power threshold.

16. A photonic chip, comprising:
   a multi-wavelength light source, comprising:
      a laser configured to generate a first optical signal;
      an optical modulator coupled to the laser and configured to modulate the first optical signal to obtain a second optical signal, wherein the second optical signal comprises at least two wavelength components;
      an optical mixer coupled to the optical modulator and configured to mix frequencies of the at least two wavelength components to obtain a third optical signal, wherein the third optical signal comprises at least four wavelength components;
      a demultiplexer coupled to the optical mixer and configured to separate the at least four wavelength components into separate wavelength components;
      a wavelength locker coupled to the laser and the demultiplexer and configured to:
         detect a wavelength of any one of the separate wavelength components; and
         control the laser to adjust a first wavelength of the first optical signal when the wavelength of any one of the separate wavelength components exceeds a wavelength range; and
      an optical power adjuster coupled to the demultiplexer and configured to adjust, based on a power threshold, powers of the separate wavelength components.

17. The photonic chip of claim 16, wherein the optical power adjuster is further configured to decrease the powers of each of the separate wavelength components when the powers of each of the separate wavelength components are greater than the power threshold.

18. The photonic chip of claim 16, wherein the optical power adjuster is further configured to increase the powers of each of the separate wavelength components when the powers of each of the separate wavelength components are less than the power threshold.

19. A method comprising:
   generating, with a laser, a first optical signal;
   modulating, with an optical modulator coupled to the laser, the first optical signal to obtain a second optical signal, wherein the second optical signal comprises at least two wavelength components;
   mixing, with an optical mixer coupled to the optical modulator, frequencies of the at least two wavelength components to obtain a third optical signal, wherein the third optical signal comprises at least four wavelength components;
   separating, with a demultiplexer coupled to the optical mixer, the at least four wavelength components into separate wavelength components;
   detecting, with a wavelength locker coupled to the laser and the demultiplexer, a wavelength of any one of the separate wavelength components;
   controlling the laser to adjust a wavelength of the first optical signal when the wavelength of any one of the separate wavelength components exceeds a wavelength range; and
   adjusting, with an optical power adjuster coupled to the demultiplexer, powers of each of the separate wavelength components based on a power threshold.

20. The method of claim 19, wherein the optical modulator is a Mach-Zehnder modulator (MZM).

* * * * *